United States Patent Office 3,514,463
Patented May 26, 1970

3,514,463
5,9-DIETHYL BENZOMORPHAN DERIVATIVES
Franklin M. Robinson, Ambler, Paul S. Anderson, North Wales, and James A. Nicholson, Philadelphia, Pa., assignors to Merck & Co., Inc., Rahway, N.J., a corporation of New Jersey
No Drawing. Continuation-in-part of application Ser. No. 551,551, May 20, 1966. This application Apr. 13, 1967, Ser. No. 630,493
Int. Cl. C07d 39/00
U.S. Cl. 260—294.7                     6 Claims

ABSTRACT OF THE DISCLOSURE

This invention concerns novel 5,9-diethyl-2'-hydroxy-2-substituted-6,7-benzomorphan derivatives and the isomers thereof and processes for the preparation of the same. The novel 5,9-diethyl-2'-hydroxy-2-substituted-6,7-benzomorphan derivatives have analgesic and pain-relieving activity as well as being non-addicting and non-narcotic.

---

This invention relates to novel benzomorphan derivatives which have pronounced analgesic activity. More specifically this invention relates to 5,9 - diethyl - 2'-hydroxy - 2-substituted-6,7-benzomorphan derivatives and processes for the preparation of the same. This case is a continuation-in-part of our copending application Ser. No. 551,551 filed May 20, 1966, and now abandoned.

The 5,9-diethyl-2'-hydroxy - 2 - substituted-6,7-benzomorphan derivatives of this invention have pronounced analgesic or pain-relieving activity coupled with the highly desirous property of being non-addicting and non-narcotic.

The 5,9-diethyl benzomorphans of this invention show little activity in the standard rat tail flick or rat tail pinch test, thus indicating either no addicting properties or a low order of addiction liability, since there is a direct correlation between increased addiction liability and increased activity in the above-identified tests. On the other hand, the benzomorphan derivatives of this invention show good activity in a modified Randall-Selitto test. Good activity in this test would indicate useful analgesic activity since cyclazocine and pentazocine, two known analgesics, show activity in this test and additionally are known to have low addiction liability.

The benzomorphan derivatives of this invention generally have minimal side effects and minimal toxicity and many of them have little or no narcotic antagonist activity. The lack of narcotic antagonist activity can be advantageous because of the observation that high antagonist activity has generally been associated with undesirable side effects.

A further feature of this invention resides in the fact that the compounds of this invention can be produced by synthetic means more conveniently than are members of the morphine family of naturally occurring alkaloidal analgesics.

The compounds of this invention are administered orally or subcutaneously, preferably as an aqueous solution of the hydrochloride salt and in the range of about .001 mg./kg. to about 18 mg./kg. The compounds also have a favorable therapeutic ratio.

It is an object of this invention to provide novel 5,9-diethyl-2'-hydroxy-2-substituted-6,7-benzomorphan derivatives having analgesic properties and being substantially devoid of addicting properties as well as processes for their preparation.

The compounds of this invention can be represented by the following structural formula:

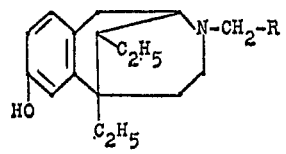

Structure I wherein R represents alkynyl, alkenyl, alkyl alkenyl, hydroxy alkenyl, cycloalkyl, alkyl cycloalkyl and alkenyl cycloalkyl.

Included in this invention are the isomers of the above-noted structures in which the two ethyl groups are in cis relationship to each other which are also referred to in this application as the normal or α-isomers.

The cis isomer discussed above can be separated into its optical isomers [dextro (+) and levo (−)] by preparing the diastereoisomeric salts with optically active acids, either d (+) or l (−), which salts can then be separated by fractional crystallization.

Prior to our invention, it had generally been known that levorotatory (−) isomers of benzomorphan compounds possessed substantially all the desired analgesic activity exhibited by the mixture of isomers whereas the dextro (+) isomer possessed little or no analgesic activity. We surprisingly found, however, that the dextro (+) isomers of many of the novel 5,9-diethyl-2'-hydroxy-2-substituted-6,7-benzomorphans of our invention possess analgesic and other desirable properties discussed above contrary to what is generally known concerning the inactivity of these isomers. Thus, it is to be understood that included in this invention along with the novel 5,9-diethyl - 2'-hydroxy-2-substituted-6,7-benzomorphan derivatives are the individual optical isomers, that is the dextrorotatory (+) as well as the levorotatory (−) isomers of our novel benzomorphan compounds. It is to be understood also that if the substituent on the nitrogen (2-position) of the benzomorphan compound contains an asymmetric center, there will be two optical isomers obtained from each of the isomers of the benzomorphan compound.

Although the compounds described above have analgesic activity, the preferred compounds of this invention are those wherein R in Structure I is lower cycloalkyl advantageously having from 3 to 6 carbon atoms and wherein the alkyl or alkenyl substituent or substituents on the cycloalkyl radical are lower alkyl or lower alkenyl both having from 1 to 5 carbon atoms.

In addition when R in Structure I is alkynyl, alkenyl or an alkyl or hydroxy substituted alkenyl, preferred benzomorphan derivatives are those wherein R is lower alkynyl having from 3 to 6 carbon atoms, lower alkenyl advantageously having from 1 to 6 carbon atoms and wherein the alkyl substituent or substituents are lower alkyl having from 1 to 5 carbon atoms.

In a special embodiment of this invention, it has been found that benzomorphan derivatives, such as 5,9-diethyl-2'-hydroxy-2-(4-pentenyl)-6,7-benzomorphan,
(+) 5,9-diethyl-2'-hydroxy-2-(4-pentenyl)-
  6,7-benzomorphan,
5,9-diethyl-2'-hydroxy-2-cyclopropylmethyl-
  6,7-benzomorphan,
5,9-diethyl-2'-hydroxy-2-(2'-methylenecyclopropylmethyl)-6,7-benzomorphan, and
(+) 5,9-diethyl-2'-hydroxy-2-(2-methylenecyclopropylmethyl)-6,7-benzomorphan have good analgesic properties.

The 5,9-diethyl-2'-hydroxy-2-substituted - 6,7 - benzomorphans of this invention can be used as such or in the form of their non-toxic, pharmaceutically acceptable acid addition salts. Such salts are prepared from suitable acids such as inorganic acids as hydrochloric or sulfuric acid, or organic acids, as acetic or maleic acid and the like. The acid addition salts are prepared by reacting the base with approximately one equivalent of the selected acid in an organic solvent such as diethyl ether or alcohol.

The 5,9 - diethyl - 2'-hydroxy-2-substituted-6,7-benzomorphans of this invention can be prepared by one or more of the following processes. One method especially suitable for the preparation of compounds of Structure I where R is alkynyl, alkenyl, alkyl alkenyl and hydroxy alkenyl involves an N-substitution which comprises heating 5,9-diethyl-2'-hydroxy-6,7-benzomorphan with a reactive halide, tosylate or sulfonate of the formula $$RCH_2X$$

(wherein X is halo, tosyl or other reactive sulfonyl containing groups and R is as defined above for Structure I, particularly however, when R is alkynyl, alkenyl, alkyl alkenyl and hydroxy alkenyl) in a water miscible solvent such as dimethylformamide or an alkanol such as ethanol at a temperature of between about 70° C. to 120° C. in the presence of an alkali metal carbonate such as sodium or potassium bicarbonate.

Another method for the preparation of the benzomorphan derivatives of this invention involves the reaction of 5,9-diethyl-2'-hydroxy-6,7-benzomorphan with two equivalents of an acid halide of the formula $RCOX_1$ (wherein $X_1$ is chloride or bromide, and R is as defined above for Structure I, particularly however when R is cycloalkyl, alkyl cycloalkyl and alkenyl cycloalkyl) in an inert solvent such as chloroform or benzene and preferably in the presence of a tertiary base such as pyridine or triethylamine to form the corresponding 5,9-diethyl-2'-acyloxy-2-acyl-6,7-benzomorphan derivative

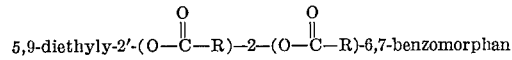
5,9-diethyly-2'-(O—C(=O)—R)-2-(O—C(=O)—R)-6,7-benzomorphan wherein R is as defined above. Reduction of these derivatives, for instance, with lithium aluminum hydride in diethyl ether or tetrahydrofuran, gives the biologically active compounds of this invention.

A third and especially suitable method for the preparation of the 5,9-diethyl - 2' - hydroxy-2-substituted-6,7-benzomorphans of the present invention involves reacting 5,9-diethyl-2'-hydroxy-6,7-benzomorphan with two equivalents of a mixed anhydried of the formula

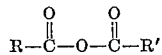
R—C(=O)—O—C(=O)—R'

(wherein R is as defined below and R' is lower alkoxy) to form the 2-acyl-2'-acyloxy-derivative

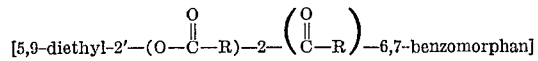
[5,9-diethyl-2'—(O—C(=O)—R)—2—(C(=O)—R)—6,7-benzomorphan]

followed again by reduction with lithium aluminum hydride in an appropriate solvent such as ethyl ether or tetrahydrofuran to form the desired compounds. The mixed anhydride in the the latter reaction is usually prepared in situ by the reaction on an appropriate tertiary amine (such as triethylamine) salt of an acid of the formula

RC(=O)OH wherein R is as defined above for Structure I, particularly however, when R is cycloalkyl, alkyl cycloalkyl, alkenyl cycloalkyl and alkenyl) with a lower alkyl chloroformate, preferably ethyl chloroformate or isobutyl chloroformate, in an inert solvent such as chloroform.

The reaction above between the benzomorphan and the mixed anhydride sometimes must be carried out at low temperatures preferably between −30° C. to 0° C.

In all the above processes, the desired end products are isolated from their particular reaction solutions or mixtures by methods known in the art.

The starting material for the preparation of the novel compounds of this invention, namely 5,9-diethyl-2'-hydroxy-6,7-benzomorphan is prepared from 5,9-diethyl-2'-hydroxy-2-methyl-6,7-benzomorphan which is a known compound. The preparation of the starting material is preferably performed by acylating 5,9-diethyl-2'-hydroxy-2-methyl-6,7-benzomorphan at the 2'-position with acetic anhydride, heating the acylated compound at elevated temperatures with cyanogen bromide in an organic solvent, preferably a halogenated hydrocarbon, for example, chloroform, thereby replacing the 2-methyl group with a cyano group and then removing the cyano and acetyl groups by hydrolysis in a dilute acid solution. A detailed preparation of the starting material is shown in Example 1.

In addition to using the racemic form of the starting material, there may be employed one of its enantiomeric forms prepared by known methods using a resolving agent such as camphor sulfonic acid, tartaric acid, dibenzoyl tartaric acid and the like to separate the (−) levo and (+) dextro isomers. Each optical isomer of 5,9-diethyl-2'-hydroxy-6,7-benzomorphan can then be used as the starting material in the various examples resulting in (+) dextro or (−) levo 5,9-diethyl-2'-hydroxy-2-substituted-6,7-benzomorphans. Alternatively, the racemic 5,9-diethyl - 2' - hydroxy - 2-substituted-6,7-benzomorphan end products can themselves be resolved according to a procedure similar to that described above, to yield the dextrorotatory (+) and levorotatory (−) isomers of 5,9-diethyl - 2' - hydroxy - 2-substituted-6,7-benzomorphans. If, however, the nitrogen substituent of the benzomorphan compound contains an asymmetric carbon center, the 2-diasteriomers resulting from each (dextro) or (levo) benzomorphan can also be separated. Thus, for example, the compound α-5,9-diethyl-2'-hydroxy-2-(2-methylenecyclopropylmethyl) - 6,7 - benzomorphan can exist as two different levorotatory isomers and two different dextrorotatory isomers.

The following examples illustrate the various methods described above for the preparation of the novel 5,9-diethyl-2'-hydroxy-2-substituted-6,7-benzomorphans of the present invention.

In all of the examples the cis (normal or α) form of the 5,9-diethyl-2'-hydroxy-6,7-benzomorphan is used as the starting material thus yielding the corresponding cis-end product. However, in some instances the dextrorotatory (+) or the levorotatory (−) isomer of cis 5,9-diethyl-2'-hydroxy-6,7-benzomorphan is used as the starting material thus yielding the corresponding dextrorotatory (+) or levorotatory (−) end product. The examples should be construed as illustrations of the invention and not as limitations thereof.

EXAMPLE 1

Preparation of cis-5,9-diethyl-2'-hydroxy-6,7-benzomorphan from 5,9-diethyl-2'-hydroxy-2-methyl-6,7-benzomorphan Five grams of 5,9-diethyl-2'-hydroxy-2-methyl-6,7-benzomorphan and 8.7 ml. of acetic anhydride are combined and heated on a steam bath for 35 minutes. The clear solution is cooled and poured into 15 ml. of ice water. This mixture is made alkaline to pH 10–12 with 40% NaOH. The basic mixture is then extracted with chloroform and the chloroform washed with water and dried over sodium sulfate. The residue is dissolved in 37 ml. of dry chloroform. This solution is added over ½ hour to a stirred solution of 6.37 g. of cyanogen bromide dissolved in 37 ml. of chloroform. The reaction mixture is then refluxed for three hours and evaporated to dryness under reduced pressure. The residue which is 5,9-diethyl-2'-acetoxy-2-cyano-6,7-benzomorphan is treated with 70 ml. of 6% HCl and refluxed for 8 hours. The reaction mixture is cooled, made alkaline to pH 10 with ammonium hydroxide, washed with chloroform and dried over sodium sulfate. The mixture is then concentrated to dryness as above to yield crude 5,9-diethyl-2'-hydroxy-6,7-benzomorphan. After recrystallization from ethanol, the 5,9-diethyl-2'-hydroxy-6,7-benzomorphan has a melting point of 265–268° C.

*Analysis.*—Calculated for $C_{16}H_{23}NO$ (percent): C, 78.32; H, 9.45; N, 5.71. Found (percent): C, 78.01; H, 9.28; N, 5.42.

EXAMPLE 2

5,9-diethyl-2'-hydroxy-2-allyl-6,7-benzomorphan 5,9-diethyl-2'-hydroxy-6,7-benzomorphan (0.98 g.) is added to a mixture of 0.6 g. of allyl bromide and 0.5 g. of sodium bicarbonate in 17.5 ml. of ethanol. The reaction mixture is refluxed for 18 hours, filtered and concentrated to dryness under reduced pressure. Ether (35 ml.) is added to the residue and the mixture filtered. The ether filtrate is then evaporated to dryness to yield crude 5,9-diethyl-2'-hydroxy-2-allyl-6,7-benzomorphan which is recrystallized from benzene. The melting point of the recrystallized material is 159° C. to 160° C.

*Analysis.*—Calculated for $C_{19}H_{27}NO$ (percent): C, 79.95; H, 9.54; N, 4.91. Found (percent): C, 80.26; H, 9.58; N, 4.86.

Following the procedure above, but using the starting material shown in Column I in place of allyl bromide there is produced the corresponding compound shown in Column II.

| I | II |
| --- | --- |
| 1-bromo-3-butene | 5,9-diethyl-2'-hydroxy-2-(3-butenyl)-6,7-benzomorphan. |
| 1-bromo-3-butyne | 5,9-diethyl-2'-hydroxy-2-(3-butynyl)-6,7-benzomorphan. |
| 1-bromo-4-pentyne | 5,9-diethyl-2'-hydroxy-2-(4-pentynyl)-6,7-benzomorphan. |

EXAMPLE 3

5,9-diethyl-2'-hydroxy-2-(4-pentenyl)-6,7-benzomorphan

Following the general procedure of Example 2, 5,9-diethyl-2'-hydroxy-2-(4-pentenyl)-6,7-benzomorphan is prepared from 0.735 g. of 5,9-diethyl-2'-hydroxy-6,7-benzomorphan by adding the latter compound to 0.451 g. of 5-bromo-1-pentene and 0.38 g. of sodium bicarbonate in 13 ml. of ethanol and refluxing the mixture for 15 hours. The 5,9-diethyl-2'-hydroxy-2-(4-pentenyl)-6,7-benzomorphan is isolated as described in Example 2 except that it is recrystallized from cyclohexane. The melting point of the recrystallized material is 155.5° C. to 158° C.

*Analysis.*—Calculated for $C_{20}H_{29}NO$ (percent): C, 80.46; H, 9.97; N, 4.47. Found (percent): C, 80.86; H, 9.76; N, 4.40.

EXAMPLE 4

5,9-diethyl-2'-hydroxy-2-methallyl-6,7-benzomorphan 5,9-diethyl-2'-hydroxy-2-methallyl-6,7-benzomorphan is prepared by refluxing a mixture of 0.735 g. of 5,9-diethyl-2'-hydroxy-6,7-benzomorphan, 0.27 g. of methallyl chloride, 0.38 g. of sodium bicarbonate and 13.7 g. of ethanol for 5 hours and then isolating crude 5,9-diethyl-2'-hydroxy-2-methallyl-6,7-benzomorphan by following the procedure of Example 2. The hydrochloride salt of 5,9-diethyl-2'-hydroxy-2-methallyl-6,7-benzomorphan is prepared by passing dry HCl gas into an ethyl ether solution of the crude 5,9-diethyl-2'-hydroxy-2-methallyl-6,7-benzomorphan and the product then purified from an acetone-ether solution. The melting point of the 5,9-diethyl-2'-hydroxy-2-methallyl-6,7-benzomorphan hydrochloride is 150° C. to 153° C.

*Analysis.*—Calculated for $C_{20}H_{29}NO \cdot \tfrac{3}{4} H_2O$ (+HCl) (percent): C, 68.76; H, 9.08; N, 4.01. Found (percent): C, 68.75; H, 8.95; N, 4.24.

Following the procedure above but using the starting material shown in Column I in place of methallyl chloride there is produced the corresponding compound shown in Column II.

| I | II |
| --- | --- |
| 2-propyl-allyl chloride | 5,9-diethyl-2'-hydroxy-2-(2-propylallyl)-6,7-benzomorphan. |
| 1-bromo-4-methyl-3-pentene | 5,9-dietyhl-2'-hydroxy-2-(4-methyl-3-pentenyl)-6,7-benzomorphan. |

EXAMPLE 5

5,9-diethyl-2'-hydroxy-2-(2-hydroxy-3-butenyl)-6,7-benzomorphan

A mixture of 2.45 g. of 5,9-diethyl-2'-hydroxy-6,7-benzomorphan, 1.51 g. of 1-bromo-3-buten-2-ol, 1.26 g. of sodium bicarbonate and 45 ml. of ethanol is heated at reflux for 8 hours. The mixture is then filtered and the filtrate evaporated to dryness under reduced pressure. Ether is added to the resulting solid residue, the mixture stirred and again filtered. The filtrate is evaporated to dryness and the residue again dissolved in ether. The solution is dried over molecular sieves and the dried ether solution again evaporated to dryness and the residue extracted with hexane and filtered. The hexane solution is evaporated to dryness under reduced pressure. The resulting residue which is essentially 5,9-diethyl-2'-hydroxy-2-(2-hydroxy-3-butenyl)-6,7-benzomorphan, is then recrystallized from a hexane solution and then it is dried over phosphorus pentoxide at 0.1 mm. pressure at 35° C. The resulting crystalline 5,9-diethyl-2'-hydroxy-2-(2-hydroxy-3-butenyl)-6,7-benzomorphan has a melting point of 65° C. to 67° C.

*Analysis.*—Calculated for $C_{20}H_{29}NO_2$ (percent): C, 76.15; H, 9.27; N, 4.44. Found (percent): C, 76.24; H, 8.95; N, 4.28.

EXAMPLE 6

5,9-diethyl-2'-hydroxy-2-cyclopropylmethyl-6,7-benzomorphan

A solution of 1.30 g. of cyclopropylcarbonyl chloride in 9 ml. of chloroform is added slowly to a cooled solution of 1.5 g. of 5,9-diethyl-2'-hydroxy-6,7-benzomorphan in 35 ml. of dry chloroform and 5.5 ml. of dry triethylamine. The reaction mixture is refluxed for 12 hours, cooled, washed with dilute HCl, dilute $Na_2CO_3$ and water and then dried over sodium sulfate. The chloroform is evaporated under reduced pressure to yield 5,9-diethyl-2'-acyloxy-2-acyl-6,7-benzomorphan in the form of a brown oil. The 2'-acyloxy-2-acyl intermediate is then reduced by dissolving it in 6.2 ml. of tetrahydrofuran and adding the tetrahydrofuran solution to a stirred suspension of 0.9 g. of lithium aluminum hydride in 9.5 ml. of dry tetrahydrofuran. The reaction mixture is refluxed for 3½ hours, cooled and 2.7 ml. of ethyl acetate added cautiously followed by the addition of 4.5 ml. of water. "Filtercel," a form of diatomaceous earth, is then added and the reaction mixture is filtered through a pad of "Filtercel." The filter cake is washed with tetrahydrofuran and the combined tetrahydrofuran filtrates are concentrated to dryness under reduced pressure to yield crude 5,9-diethyl-2'-hydroxy-(2-cyclopropylmethyl)-6,7-benzomorphan. After recrystallization from methanol, the 5,9-diethyl-2'-hydroxy-2-cyclopropylmethyl-6,7-benzomorphan has a melting point of 174° C. to 176° C.

*Analysis.*—Calculated for $C_{20}H_{29}NO$ (percent): C, 80.22; H, 9.76; N, 4.68. Found (percent): C, 80.37; H, 9.67; N, 4.65.

Following the procedure above but using the starting material shown in Column I in place of cyclopropylcarbonyl chloride, there is produced the corresponding compound shown in Column II.

| I | I |
|---|---|
| Cyclohexylcarbonyl chloride | 5,9-diethyl-2'-hydroxy-2-cyclohexylmethyl-6,7-benzomorphan. |
| 2-methylcyclopentylcarbonyl chloride. | 5,9-diethyl-2'-hydroxy-2-(2-methylcyclopentylmethyl)-6,7-benzomorphan. |
| 2-methylcyclobutylcarbonyl chloride. | 5,9-diethyl-2'-hydroxy-2-(2-methylcyclobutylmethyl)-6,7-benxomorphan. |

EXAMPLE 7

5,9-diethyl-2'-hydroxy-2-(2-methylenecyclopropylmethyl)-6,7-benzomorphan

To a stirred ice cold solution of 2.94 g. of 2-methylene cyclopropane carboxylic acid in 50 ml. of chloroform is added 3.03 g. of triethylamine followed by 4.10 g. of isobutyl chloroformate. After stirring at 0° C. for 15 minutes, 3.18 g. of 5,9-diethyl-2'-hydroxy-6,7-benzomorphan is added and stirring at 0° C. is continued for two hours. The reaction mixture is diluted with 150 ml. of ether and washed with 100 ml. of 10% aqueous hydrochloric acid, 80 ml. of water, 100 ml. of 5% aqueous sodium bicarbonate and 80 ml. of water in order. The ether extracts are dried over anhydrous magnesium sulfate, filtered and concentrated to 25 ml. volume. This concentrate consisting of the appropriate 5,9-diethyl-2'-acyloxy-2-acyl-6,7-benzomorphan is added dropwise with stirring to a slurry of 1.5 g. of lithium aluminum hydride in 150 ml. of dry ethyl ether. The suspension is heated under reflux for 5 hours and then excess lithium aluminum hydride is decomposed by the dropwise addition of 4 ml. of water. The precipitated inorganic salts are separated by filtration and thoroughly washed with ether. The combined ether filtrates are concentrated to dryness and the crystalline residue is dissolved in a few milliliters of hot methanol and filtered. On cooling, the filtrate deposits 5,9-diethyl-2'-hydroxy-2-(2-methylenecyclopropylmethyl) - 6,7 - benzomorphan. Recrystallization from hot methanol yields a sample having a melting point of 162° C. to 176° C. The above product is a mixture of two racemates.

*Analysis.*—Calculated for $C_{21}H_{29}NO$ (percent): C, 80.97; H, 9.38; N, 4.50. Found (percent): C, 80.90; H, 9.30; N, 4.46.

Following the procedure above but using the starting material shown in Column I in place of 2-methylenecyclopropane carboxylic acid, there is produced the corresponding compound shown in Column II.

| I | II |
|---|---|
| 2-allylcyclopropane carboxylic acid. | 5-9-diethyl-2'-hydroxy-2-(2-allylcyclopropylmethyl)-6,7-benzomorphan. |
| 2-vinylcyclopropane carboxylic acid. | 5,9-diethyl-2'-hydroxy-2-(2-vinylcyclopropylmethyl)-6,7-benzomorphan. |

The 5,9-diethyl - 2' - hydroxy-2-(2-vinylcyclopropylmethyl)-6,7-benzomorphan has a melting point of 162° C. to 176° C.

EXAMPLE 8

Preparation of (—) diastereomers of 5α,9α-diethyl-2-(2-methylene-cyclopropylmethyl) - 2' - hydroxy-6,7-benzomorphan To a stirred ice cold solution of 12.35 g. (0.126 mole) of methylene cyclopropyl carboxylic acid and 12.73 g. (0.126 mole) of triethylamine in 250 ml. of dry chloroform is added at a fast drip 17.21 g. (0.126 mole) of isobutyl chloroformate. Fifteen minutes after addition is completed, 14.7 g. (.06 mole) of (—) 5α,9α-diethyl-2'-hydroxy-6,7-benzomorphan is added in one portion as a finely ground powder. The reaction mixture is stirred 3 hours at 0° C. and 1 hour at room temperature. The solvent is then evaporated under reduced pressure. The residue is distributed between 100 ml. of ice cold 5% aqueous hydrochloric acid and 400 ml. of ether. The ether solution is separated and washed with 100 ml. of ice water, 100 ml. of 5% aqueous sodium bicarbonate solution and 100 ml. of ice water in that order. The organic solution is then dried over magnesium sulfate and filtered and the filtrate concentrated to 75 ml. This solution is added dropwise to a stirred slurry of 5.3 g. of lithium aluminum hydride in 350 ml. of dry ether. The slurry is stirred under reflux for 4.5 hours and then treated with 10.5 ml. of H₂O added dropwise with stirring. The reaction mixture is filtered and the inorganic salts thoroughly washed with fresh ether. The combined filtrates are evaporated and the residue dissolved in 100 ml. of hot methanol and filtered. The filtrate on cooling deposited 5.7 g. of crystals, M.P. 170–200° C. Upon concentration to 50 ml. and cooling the filtrate deposited an additional 2.2 g. of crude product. The combined product is fractionally recrystallized from methanol to yield 5.0 g. of pure (—) diastereomer of 5α,9α-diethyl-2-(2-methylene cyclopropylmethyl) - 2' - hydroxy-6,7-benzomorphan. The material has a melting point of 214–215° C. and an [α]$_D$ of —88° (1 g./100 ml., methanol).

*Analysis.*—Calculated for $C_{21}H_{29}NO$ (percent): C, 80.97; H, 9.38; N, 4.50. Found ([α]$_D$=—88°) (percent): C, 80.92; H, 9.22; N, 4.53.

All mother liquors from above-described reaction are combined and evaporated. The residue is dissolved in 300 ml. of ether and extracted with 10% aqueous hydrochloric acid (3× 150 ml.). The combined aqueous extracts are made basic and extracted with 4× 125 ml. of ethyl ether. The combined ether extracts are dried over magnesium sulfate, filtered and the filtrate evaporated to yield 9 grams of solid residue. This residue is dissolved in 70 ml. of methanol and cooled. On standing, 2.1 g. of solid, M.P. 165–195° C., separated. The mother liquor is evaporated and the residue extracted with hot hexane using 200 ml. of hot hexane per gram of residue. The solid which collects on cooling is fractionated from hot hexane using the same solvent to solid ratio. After numerous recrystallization, 4.8 g. of the (—) diastereomer of 5α,9α-diethyl - 2' - hydroxy - 2 - (2-methylene cyclopropylmethyl) - 6,7 - benzomorphan, M.P. 153–155°, ([α]$_D$=—117°) (1 g./ ml., methanol), are obtained. This diastereomer has a melting point of 153–155° C. and an [α]$_D$ of —117° (1 g./100 ml., methanol).

*Analysis.*—Calculated for $C_{21}H_{29}NO$ (percent): C, 80.97; H, 9.38; N, 4.50. Found (percent): C, 80.96; H, 9.50; N, 4.50.

EXAMPLE 9

Preparation of (+) diastereomers of 5α,9α-diethyl-2-(2-methylene cyclopropylmethyl) - 2' - hydroxy-6,7-benzomorphan Following the procedure of Example 8 but using an equimolar amount of (+) 5α,9α-diethyl-2'-hydroxy-6,7-benzomorphan in place of (—) 5α,9α-diethyl-2'-hydroxy-6,7-benzomorphan used as a starting material in Example 9 there are obtained two (+) diastereomers of 5α,9α-diethyl - 2 - (2-methylene cyclopropylmethyl)-2'-hydroxy-6,7-benzomorphan.

Isomer 1 has the following physical constants: melting point: 214–215° C.; [α]$_D$=+88° (1 g./100 ml., methanol).

*Analysis.*—Calculated for $C_{21}H_{29}NO$ (percent): C, 80.97; H, 9.38; N, 4.50. Found (percent): C, 80.82; H, 9.20; N, 4.67.

Isomer 2 has the following physical constants: melting point: 153–155° C.; [α]$_D$=+117° (1 g./100 ml., methanol).

*Analysis.*—Calculated for $C_{21}H_{29}NO$ (percent): C, 80.97; H, 9.38; H, 4.50. Found (percent): C, 81.24; H, 9.46; N, 4.49.

EXAMPLE 10

5,9-diethyl-2'-hydroxy-2-(cyclobutylmethyl)-6,7-benzomorphan

Following the procedure of Example 7, but using 0.59 g. of cyclobutane carboxylic acid, 0.606 g. of triethylamine, 0.648 g. of ethyl chloroformate, 0.5 g. of 5,9-diethyl-2'-hydroxy-6,7-benzomorphan and 0.45 g. of lithium aluminum hydride in 125 ml. of dry ether in place of the reactants used in Example 7, 5,9-diethyl-2'-hydroxy-2-(cyclobutylmethyl)-6,7-benzomorphan having a melting point of 144° C. to 145° C. is produced.

*Analysis.*—Calculated for $C_{21}H_{31}NO$ (percent): C, 80.45; H, 9.97; N, 4.47. Found (percent): C, 80.05; H, 10.07; N, 4.51.

Following the procedure above but using the starting material shown in Column I in place of cyclobutane carboxylic acid, there is produced the corresponding compound shown in Column II.

| I | II |
|---|---|
| 4-ethylcyclohexane carboxylic acid. | 5,9-diethyl-2'-hydroxy-2-(4-ethylcyclohexylmethyl)-6,7-benzomorphan. |
| -vinylcyclopentane carboxylic acid. | 5,9-diethyl-2'-hydroxy-2-(3-vinylcyclopentylmethyl)-6,7-benzomorphan. |

What is claimed is:

1. A member selected from the group consisting of compounds of the formula

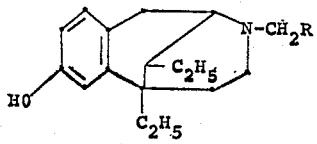

where R is alkenylcycloalkyl and hydroxy alkenyl where the cycloalkyl group contains from 3 to 6 carbon atoms and the alkenyl group contains from 2 to 6 carbon atoms and nontoxic acid addition salts thereof.

2. The dextrorotatory (+) optical isomeric forms of a compound according to claim 1.

3. The levorotatory (−) optical isomeric forms of a compound according to claim 1.

4. A compound according to claim 1 wherein R is 2-methylenecyclopropyl thus forming 5,9-diethyl-2'-hydroxy-2-(2-methylenecyclopropylmethyl)-6,7 - benzomorphan.

5. The dextrorotatory (+) isomers of the compound of claim 4.

6. The levorotatory (−) isomers of the compound of claim 4.

References Cited

UNITED STATES PATENTS

| | | | |
|---|---|---|---|
| 3,250,678 | 5/1966 | Archer | 167—65 |
| 3,320,265 | 5/1967 | Clarke | 260—294.7 |
| 3,351,626 | 11/1967 | Bartels-Keith et al. | 260—294.3 |
| 3,372,165 | 3/1968 | Archer | 260—294.7 |
| 2,713,574 | 7/1955 | Vaughan. | |
| 2,259,513 | 10/1941 | Barnes | 260—464 |
| 2,369,158 | 2/1945 | Milos | 260—464 |
| 2,388,657 | 11/1945 | Long | 260—544 |
| 246,157 | 4/1966 | Germany. | |
| 921,547 | 3/1963 | Great Britain. | |
| 246,157 | 4/1966 | Germany. | |
| 921,547 | 3/1963 | Great Britain. | |

OTHER REFERENCES

Chemical Abstracts, vol. 58, February 1963, "Benzazorines," Archer (II) 2439–2440.

HENRY R. JILES, Primary Examiner

S. D. WINTERS, Assistant Examiner

U.S. Cl. X.R.

260—294, 294.3, 463, 514, 544; 424—267